March 29, 1932.                A. V. BODINE                1,851,659

PHONOGRAPH RECORD

Filed Sept. 2, 1927

INVENTOR.
ALFRED V. BODINE.
BY
ATTORNEY

Patented Mar. 29, 1932

1,851,659

UNITED STATES PATENT OFFICE

ALFRED V. BODINE, OF FAIRFIELD, CONNECTICUT

PHONOGRAPH RECORD

Application filed September 2, 1927. Serial No. 217,051.

This invention relates to sound records and more particularly to sound-record tablets used in conjunction with dictating and allied machines.

An object of this invention is to provide a record tablet so reinforced that some of the strains incidental to the regular use of the tablets will be absorbed and also allow contraction and expansion of the tablet caused by temperature changes.

Another object of the present invention is to provide reinforcing means for sound-record tablets which will yieldingly hold the parts or fragments thereof together should the tablet be broken or cracked, and thereby prevent or minimize the shattering of the record tablet and thus enable all or part of the record to be reproduced even though it be thus damaged.

This is accomplished, according to the present invention, by the provision of a resilient reinforcement for the tablet, preferably in the form of a filler, which is normally under tension and which thus serves to limit the extent of the breakage and to hold the parts or fragments yieldingly together and automatically closing any fissures or cracks which might exist when the cause which produced the damage ceases to exist or is removed.

And yet another object is to provide a suitable form of resilient reinforcement for the purposes referred to which will neither interfere with the ordinary method of making sound-records nor require substantial changes of the form, size or composition of records.

An important feature of the invention is the provision of a yielding reinforcement which is so formed as to allow the molten waxy material to flow through it when the record is being molded to form a homogeneous mass extending through the reinforcement and on both sides of it, whereby the reinforcement may be embedded in the body of the record-tablet instead of merely lying upon its surface.

A further feature of the present invention is the provision in a cylindrical record-tablet having a helically fluted inside surface of a resilient reinforcement comprising a molded perforated sleeve made of rubber or other similar material.

Other objects and advantages will hereinafter appear.

In the accompanying drawings—

As shown in the accompanying drawings, the sound-record tablet 10 is in the form of a hollow cylinder upon the periphery of which a sound-record may be made by a suitable knife-like recording stylus to be later reproduced by a suitable reproducing stylus. During these recording an reproducing operations, the record-tablet is usually supported upon a mandrel having spring-pressed plungers or other suitable devices for firmly engaging the record-tablet and holding it for rotation and against lateral displacement.

Figure 2:
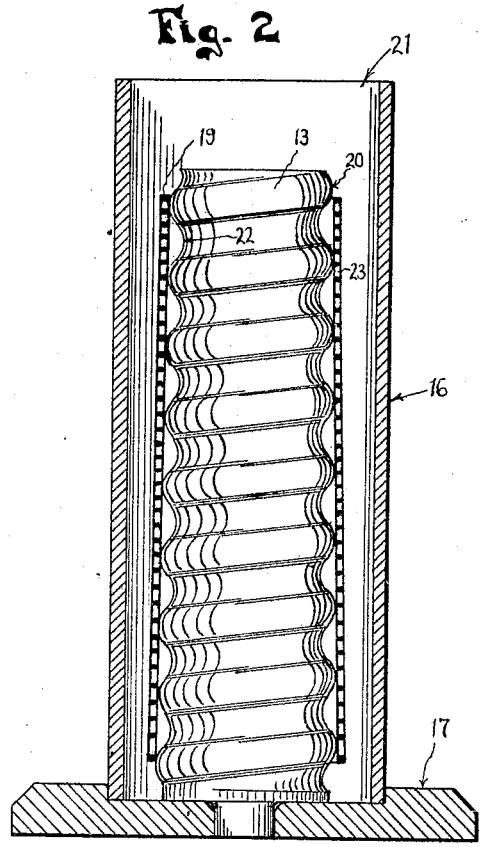
Fig. 2 is a view partly in section of the mold used in making the record tablet and shows a resilient reinforcement located on the core of the mold.

The mandrel upon which the record-tablet is placed is usually tapered and consequently the internal surface of the tablet correspondingly tapers from the small end 11 to the large end 12. The taper is usually provided among other reasons to enable the tablet to be easily withdrawn from a core 13 about which it is molded and to allow the tablet to be easily applied to and removed from the mandrel in a dictation machine or the like. In order to increase the grip of the mandrel upon the tablet, its inside surface is fluted, having helical ribs 14 and grooves 15. These ribs and grooves are produced in the manufacture of the tablet by molding it about the helically fluted core 13, forming part of a mold which also includes a shell 16 for shaping the outside of the tablet and a base 17 for supporting the core and shell, see Fig. 2.

The upper end of the shell 16 is open and the molten wax-like record material is poured into the shell through this opening when the record is being made. After the waxy material has sufficiently congealed, the shell is slid from the molded tablet by suitable means and then the core 13 is removed by rotating it while the tablet is held. In this operation, the helical flutes of the core act as screw-threads to facilitate the withdrawal of the core from the record-tablet, thereby making this a very easy operation.

Figure 1:
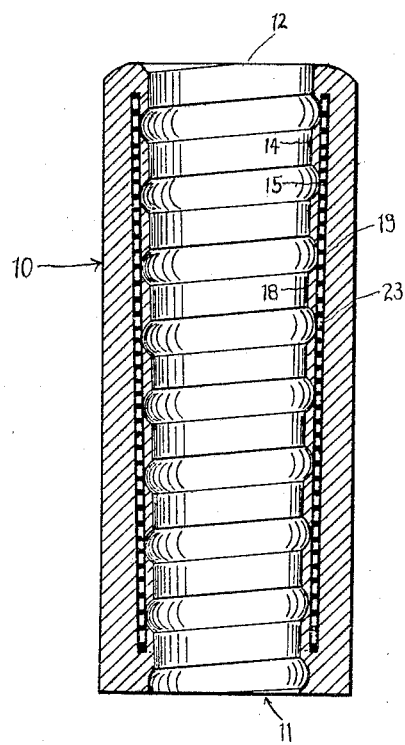
Figure 1 is a sectional view of a cylindrical record tablet made in accordance with this invention.

After the record-tablet is removed from the core 13 and it is seasoned, it is reamed to remove the top portion of the helical ribs 14 between the roots of the helical flutes or grooves 15, so as to increase the contact surface of the record-tablet with a supporting mandrel and to make it concentric so that it will accurately fit the same. This reamed surface is indicated at 18 in Fig. 1.

The usual record-tablet, because it is made of a hard wax-like material and is cylindrical in shape with small cross-section, is inherently quite fragile so that internal stresses and strains incidental to the regular use of the tablet occasionally causes it to crack and break. Occasionally, the record-tablet is inadvertently subjected to a damaging shock which ordinarily shatters the fragile tablet to such an extent that matter previously dictated cannot be reproduced. These conditions represent a real disadvantage for, while such an occurrence seldom happens, it usually necessitates redictating, with considerable inconvenience, the matter recorded on the cracked or broken record-tablet.

In order to offset or minimize these disadvantages, reinforcements of various kinds have heretofore been proposed. While certain of these reinforcements have shown marked improvements, they have been of such a nature that the natural expansion and contraction of the tablet occasioned by temperature changes and other causes, very often caused the record material to crack due to the difference between the coefficients of expansion of the record-material and the reinforcement therefor.

Figures 3, 4:
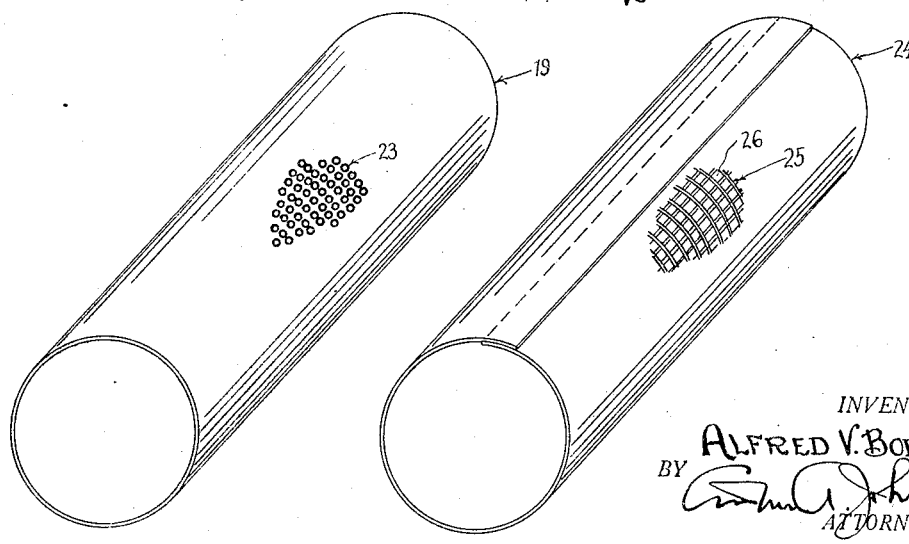
Fig. 3 is a perspective view of one form of the resilient reinforcing element made in accordance with this invention.
Fig. 4 is a perspective view of a modified form of the reinforcing element made in accordance with the present invention.

To reinforce the record-tablet, the present invention provides in the tablet a reinforcing member 19 of yielding material which, for reasons referred to below, is preferably made of rubber or some composition containing rubber. In the case of cylindrical sound-record tablets, such as are ordinarily used in dictation machines, this member 19 is preferably molded so as to have the form of a tapering tube or sleeve, as shown in Fig. 3.

In making the tablet 10 according to this invention, this rubber sleeve 19 is adapted to be slipped over the core 13 so as to lie on the tops of core ribs 20 and is held thereon by its own action. It is sufficiently rigid, however, so that the force of the molten record material when poured in the open end 21 of the shell will not disturb its position on the core. Although the sleeve is preferably forced on the core 13 so as to be normally under tension for reasons explained below, because of the thickness and stiffness of the sleeve wall, the parts of the sleeve lying above the grooves 22 of the core 13 do not enter them to any substantial or appreciable extent. Thus, when the record is molded, the inner section or helical ribs 14 will be constituted solely by record material and will not contain any portion of the sleeve 19.

This sleeve 19, according to the present invention, is preferably provided with perforations or other foramen 23 which are so large that when the record is being molded, the molten wax-like material will freely flow therethrough from either or both sides of the sleeve 19 to thus securely unite the sleeve to the body of the record and form the ribs 14 and grooves 15 on the internal surface as an integral mass with the main or body portion of the tablet.

Thus, it will be seen that the present invention provides a yielding reinforcement which, as a filler embedded in the record-tablet, lends itself to the regular methods of making record-tablets and does not necessitate abandonment of the advantageous internally tapered and fluted construction and also allows machining the tops of the ribs 14 without touching the reinforcement when qualifying the internal surface.

Occasionally, strains incidental to the regular use of the record-tablet or internal strains of the tablet material cause the tablet to crack or break, but the loss due to such accidents is minimized by the present invention, for should a crack or break occur, the sleeve 19, because it is made of rubber or the like and is normally under tension, serves to draw the cracked or broken parts together so that matter recorded on the damaged tablet may be reproduced.

Further, according to the present invention, the resilient reinforcement which is normally under tension in the tablet serves to minimize shattering of the tablet should the latter be dropped or struck against some object, by drawing the broken parts of the tablet together, a result not obtainable with types of reinforcements heretofore suggested. Usually, it is effective to hold the cracked or broken parts together well enough so that matter recorded on the tablet may be reproduced.

Further, regular contraction and expansion of the tablet, due to temperature changes or other causes, have no damaging effects upon the tablet provided with this resilient type of reinforcement because it yields sufficiently for all of these conditions.

Since this yielding reinforcement is made of a non-fibrous material, a further advantage is obtained. The special care usually required to keep reinforcement fibers out of the working surface of the record-tablet is obviated.

In the modification shown in Fig. 4, the rubber sleeve 24 is made of rubber threads 25 held together so as to form a cloth-like rubber fabric, the foramina 26 of which are large enough to allow the molten record material to flow therethrough when the record is molded. This rubber fabric may be butt or seam vulcanized as a sleeve as seen in Fig. 4. This resilient sleeve 24 may also be made of perforated strip rubber, butt or seam vulcanized in like manner.

It will be understood that the invention may be variously modified and embodied within the scope of the subjoined claims.

Having thus described the invention, what is claimed as new and for which it is desired to obtain Letters-Patent, is:—

1. A cylindrical sound-record tablet having an elastic and flexible reinforcing member embedded therein.

2. A cylindrical sound-record tablet having a tapering fluted bore, and having a resilient and flexible reinforcing member embedded therein adjacent the bottoms of the flutes.

3. A cylindrical sound-record tablet having a central bore provided with a helical groove, and having a flexible reinforcement of perforated resilient material embedded therein and located at the part of the tablet circumscribed by the root of said helical groove.

4. A molded cylindrical sound-record tablet formed of a wax-like material and having an internally fluted surface, and reinforcing means comprising a foraminous rubber sleeve, the foramina of which are large enough to allow molten wax-like material to freely flow therethrough when the record is molded.

5. A sound-record tablet having a reinforcing member of resilient and flexible material embedded therein.

6. A cylindrical sound-record tablet having a working surface and a supporting surface and a sleeve of elastic and flexible reinforcing material located between the working surface and the supporting surface.

7. A cylindrical sound-record tablet having a working surface and a supporting surface, and means comprising the perforated rubber sleeve located between the working surface and the supporting surface to reinforce the said tablet and yield with the changes in form thereof in expanding and contracting due to temperature changes.

8. A cylindrical sound-record tablet having a fluted core, and means comprising a perforated rubber sleeve embedded therein adjacent the bottoms of the flutes to yieldingly reinforce the said tablet.

9. A cylindrical sound-record tablet having a molded foraminated rubber sleeve embedded therein to yieldingly reinforce the tablet.

10. A sound-record tablet having a working surface and a supporting surface of record material, and resilient and flexible reinforcing means located between the working surface and the supporting surface, said means being foraminated to allow the record material to fill the foramen when making the record and thereby form a bond between said surfaces.

11. A cylindrical sound-record tablet having a tapering and fluted bore, and a reinforcing member of elastic and non-breakable material embedded therein.

12. A reinforcing member for sound-record tablets which comprises a molded foraminated rubber sleeve.

13. A yielding reinforcing means for sound-record tablets which comprises a member of foraminous elastic material adapted to be embedded therein.

14. A sound-record tablet having a working surface and a supporting surface and reinforcing means of elastic and flexible material embedded between said surfaces.

15. A cylindrical sound-record tablet having a tapering and fluted bore, and means comprising a molded foraminated rubber sleeve embedded therein to yieldingly and resiliently reinforce the tablet.

16. A cylindrical sound-record tablet having a tapered sleeve of foraminated resilient and non-breakable material embedded therein.

17. A cylindrical sound-record tablet having a resilient reinforcement normally under tension embedded therein.

18. A cylindrical sound-record tablet having a rubber reenforcement normally under slight tension embedded therein, said reenforcement being adapted to prevent fragmentation of said tablet.

19. A cylindrical sound-record tablet having a rubber reenforcement normally under slight tension embedded therein, said reenforcement being adapted in case of breakage to hold the fragments together in close contact.

Signed at Bridgeport, in the county of Fairfield and State of Connecticut, this 1st day of September, 1927.

ALFRED V. BODINE.